A. C. WESSMANN.
BOOKBINDING.
APPLICATION FILED DEC. 29, 1915.

1,290,442.

Patented Jan. 7, 1919.

Witness:
F. George Barry.

Inventor:
Alfred C. Wessmann

UNITED STATES PATENT OFFICE.

ALFRED C. WESSMANN, OF NEW YORK, N. Y.

BOOKBINDING.

1,290,442.　　　　Specification of Letters Patent.　　Patented Jan. 7, 1919.

Application filed December 29, 1915. Serial No. 69,203.

*To all whom it may concern:*

Be it known that I, ALFRED C. WESSMANN, a citizen of the United States, and resident of the borough of Queens, in the city and State of New York, have invented a new and useful Improvement in Bookbinding, of which the following is a specification.

My invention has for its purpose to provide a book having its covers fastened to the group of leaves by means of strips of muslin or other suitable material, a portion of which strip is glued or otherwise secured to the covers and the remainder of the strip securely fastened to the outside leaves of the group by transverse stitching, such as staples fastened entirely through the group of leaves adjacent to their back edges, thus permitting the cover to swing clear of the group without placing any tension or strain on the staples or group of leaves.

Figure 1:
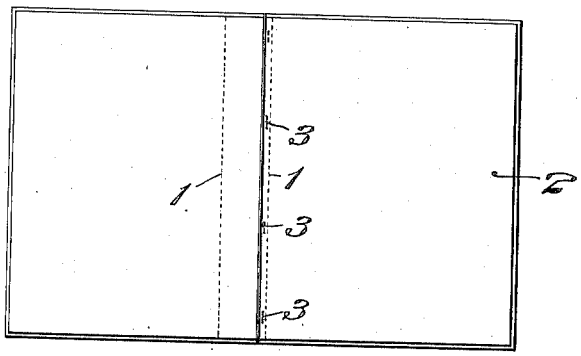

A practical embodiment of the invention is represented in the accompanying drawings in which, Figure 1 represents a plan view of a book opened at the front cover, showing the cover-attaching means in dotted lines beneath the fly leaves.

Figure 2:
Figure 3:
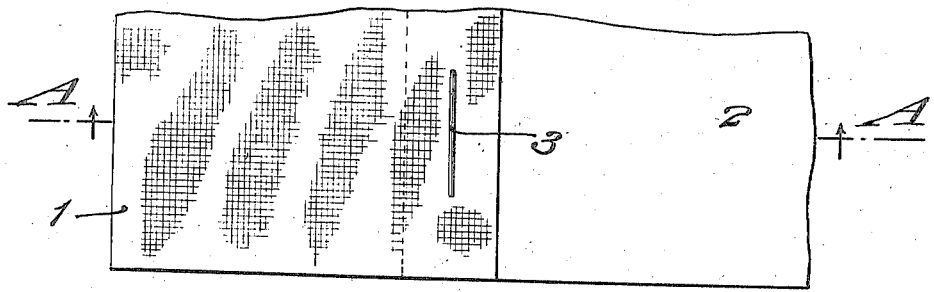
Figure 4:
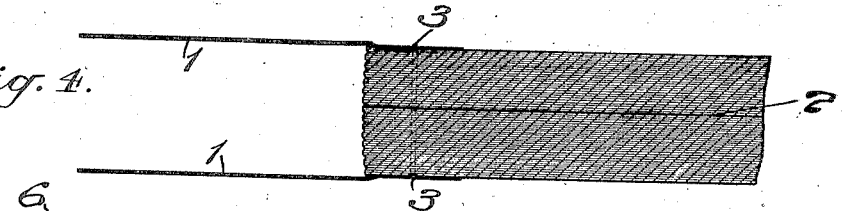
Figure 5:
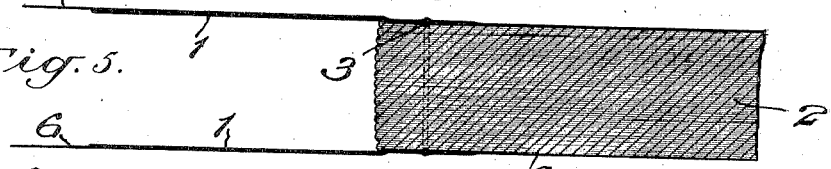
Figure 6:
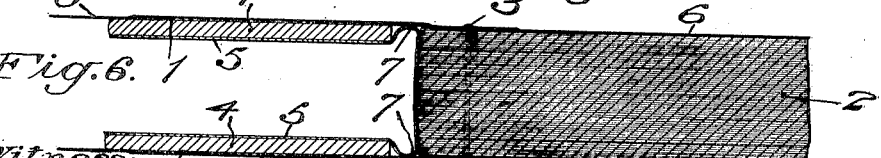

Fig. 2 is an end elevation of the same,

Fig. 3 is an enlarged detail plan view of a portion of a group of leaves and a strip of muslin or other suitable material bound together, Fig. 4 is a transverse section taken in the plane of the line A—A of Fig. 3, Fig. 5 is a similar view illustrating the fly leaves in position to be attached to the group of leaves and strips, and Fig. 6 is a similar view illustrating the covers in position with the fly leaves, strips and group of leaves secured together.

Strips 1 of muslin or other suitable material, are pasted to the sides of the group of leaves 2, adjacent to their back edges, leaving the free portions of the strips extending beyond the group, as clearly shown in Figs. 3 to 6 inclusive. These strips are further secured to the sides of the group of leaves by transverse stitching, such as staples 3, passing entirely through the group of leaves adjacent to their back edges.

The free portions of the strips 1 are glued to the front and back boards 4, of the cover while they are in their flat or open position, or in substantial parallelism with the sides of the group of leaves, as shown in Fig. 6.

The cover is provided with the usual covering or binding 5, which may be pasted to the back of the group of leaves, and which serves to protect the back and present an attractive appearance to the book.

Fly leaves 6 may be pasted to the outside leaves of the group and the inside of the cover boards 4, thus covering the strips 1 and staples 3.

It has been customary in binding books to make use of fly leaves pasted to the outside leaves and to the inside of the covers for the purpose of making a neat finish. In this manner of attaching the covers to the group of leaves, the strips 1 serve as hinges for the covers, which are free to swing from the back edges of the outside leaves, as shown at 7 in Fig. 6, thereby allowing the covers the freedom of movement without placing any tension or strain upon the group of leaves.

What I claim is:

1. A book comprising cover boards, a group of leaves, flexible strips arranged flat on the opposite sides of said group of leaves adjacent their back edges and having a portion of each of said strips extending beyond the back edges of the group of leaves to receive the cover boards in open position and wire staples passing entirely through the strips and group of leaves for securely fastening them together.

2. A book comprising cover boards, a group of leaves, flexible strips arranged flat on the opposite sides of said group of leaves adjacent their back edges and having a portion of each of said strips extending beyond the back edges of the group of leaves to receive the cover boards in open position, wire staples passing entirely through said strips and group of leaves for securely fastening them together, and fly leaves secured to the cover boards, strips, staples and outer leaves of the group of leaves to conceal the strips and staples.

In testimony, that I claim the foregoing as my invention, I have signed my name this first day of December, 1915.

ALFRED C. WESSMANN.